United States Patent
Garbacea

(10) Patent No.: US 10,534,614 B2
(45) Date of Patent: Jan. 14, 2020

(54) RESCHEDULING THREADS USING DIFFERENT CORES IN A MULTITHREADED MICROPROCESSOR HAVING A SHARED REGISTER POOL

(75) Inventor: Ilie Garbacea, Santa Clara, CA (US)

(73) Assignee: MIPS Tech, LLC, Campbell, CA (US)

( * ) Notice: Subject to any disclaimer, the term of this patent is extended or adjusted under 35 U.S.C. 154(b) by 1435 days.

(21) Appl. No.: 13/491,781

(22) Filed: Jun. 8, 2012

(65) Prior Publication Data

US 2013/0332703 A1 Dec. 12, 2013

(51) Int. Cl.
*G06F 9/38* (2018.01)

(52) U.S. Cl.
CPC ............ *G06F 9/3851* (2013.01); *G06F 9/384* (2013.01)

(58) Field of Classification Search
CPC .......... G06F 9/384; G06F 9/3851; G06F 9/46; G06F 9/5005
See application file for complete search history.

(56) References Cited

U.S. PATENT DOCUMENTS

| | | | | |
|---|---|---|---|---|
| 5,996,068 A * | 11/1999 | Dwyer et al. | | 712/228 |
| 6,092,175 A * | 7/2000 | Levy et al. | | 712/23 |
| 6,286,027 B1 * | 9/2001 | Dwyer et al. | | 718/107 |
| 6,308,252 B1 * | 10/2001 | Agarwal et al. | | 712/22 |
| 6,314,511 B2 * | 11/2001 | Levy et al. | | 712/217 |
| 2004/0215936 A1 * | 10/2004 | Ambekar et al. | | 712/217 |
| 2004/0216105 A1 * | 10/2004 | Burky et al. | | 718/100 |
| 2004/0268093 A1 * | 12/2004 | Samra et al. | | 712/217 |
| 2005/0210472 A1 * | 9/2005 | Accapadi | | G06F 9/505 718/105 |
| 2008/0016324 A1 * | 1/2008 | Burky et al. | | 712/217 |
| 2008/0270736 A1 * | 10/2008 | Nishida et al. | | 711/203 |
| 2009/0100249 A1 * | 4/2009 | Eichenberger et al. | | 712/42 |
| 2011/0261063 A1 * | 10/2011 | Jiao | | G06F 9/3004 345/522 |
| 2013/0246761 A1 * | 9/2013 | Derby et al. | | 712/225 |
| 2014/0244977 A1 * | 8/2014 | Garbacea | | 712/216 |

* cited by examiner

*Primary Examiner* — David J. Huisman
(74) *Attorney, Agent, or Firm* — Adams Intellex, PLC

(57) ABSTRACT

A method of sharing a plurality of registers in a shared register pool among a plurality of microprocessor threads begins with a determination that a first instruction to be executed by a microprocessor in a first microprocessor thread requires a first logical register. Next a determination is made that a second instruction to be executed by the microprocessor in a second microprocessor thread requires a second logical register. A first physical register in the shared register pool is allocated to the first microprocessor thread for execution of the first instruction and the first logical register is mapped to the first physical register. A second physical register in the shared register pool is allocated to the second microprocessor thread for execution of the second instruction. Finally, the second logical register is mapped to the second physical register.

26 Claims, 7 Drawing Sheets

RESCHEDULING THREADS USING DIFFERENT CORES IN A MULTITHREADED MICROPROCESSOR HAVING A SHARED REGISTER POOL

BACKGROUND

Field of the Invention

The invention is generally related to microprocessors.

Related Art

Conventional microprocessors can be implemented using multithreaded instruction execution to improve the overall performance and efficiency of the microprocessor. Conventional register approaches have registers assigned to each executing thread to support instruction execution.

Some types of instructions, e.g., Single Instruction Multiple Data (SIMD) instructions require very large number of registers. Generally implemented as hardware features on the surface of the microprocessor, registers take up valuable space. As demand for smaller and more powerful microprocessors increases, space taken up by registers can decrease the efficiency of a microprocessor. This is especially evident with large SIMD registers, the bit-size of these registers requiring larger amounts of space than older, non-SIMD implementations.

BRIEF SUMMARY OF THE INVENTION

An embodiment provides a method of sharing a plurality of registers in a shared register pool among a plurality of microprocessor threads. The method begins with a determination that a first instruction to be executed by a microprocessor in a first microprocessor thread requires a first logical register. Next, a determination is made that a second instruction to be executed by the microprocessor in a second microprocessor thread requires a second logical register. A first physical register in the shared register pool is allocated to the first microprocessor thread for execution of the first instruction and the first logical register is mapped to the first physical register. A second physical register in the shared register pool is allocated to the second microprocessor thread for execution of the second instruction. Finally, the second logical register is mapped to the second physical register.

A system for sharing a plurality of registers in a shared register pool among a plurality of microprocessor threads is also provided. The system includes a thread processing resource to execute a first and second microprocessor thread. A register determiner is used to determine that a first instruction to be executed by the first microprocessor thread requires a first logical register, and that a second instruction to be executed by the second microprocessor thread requires a second logical register. A register allocator is used to allocate a first physical register in the shared register pool to the first microprocessor thread for execution of the first instruction, and allocate a second physical register in the shared register pool to the second microprocessor thread for execution of the second instruction. Finally, a register mapper maps the first logical register to the first physical register, and the second logical register to the second physical register.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention.

Figure 1:
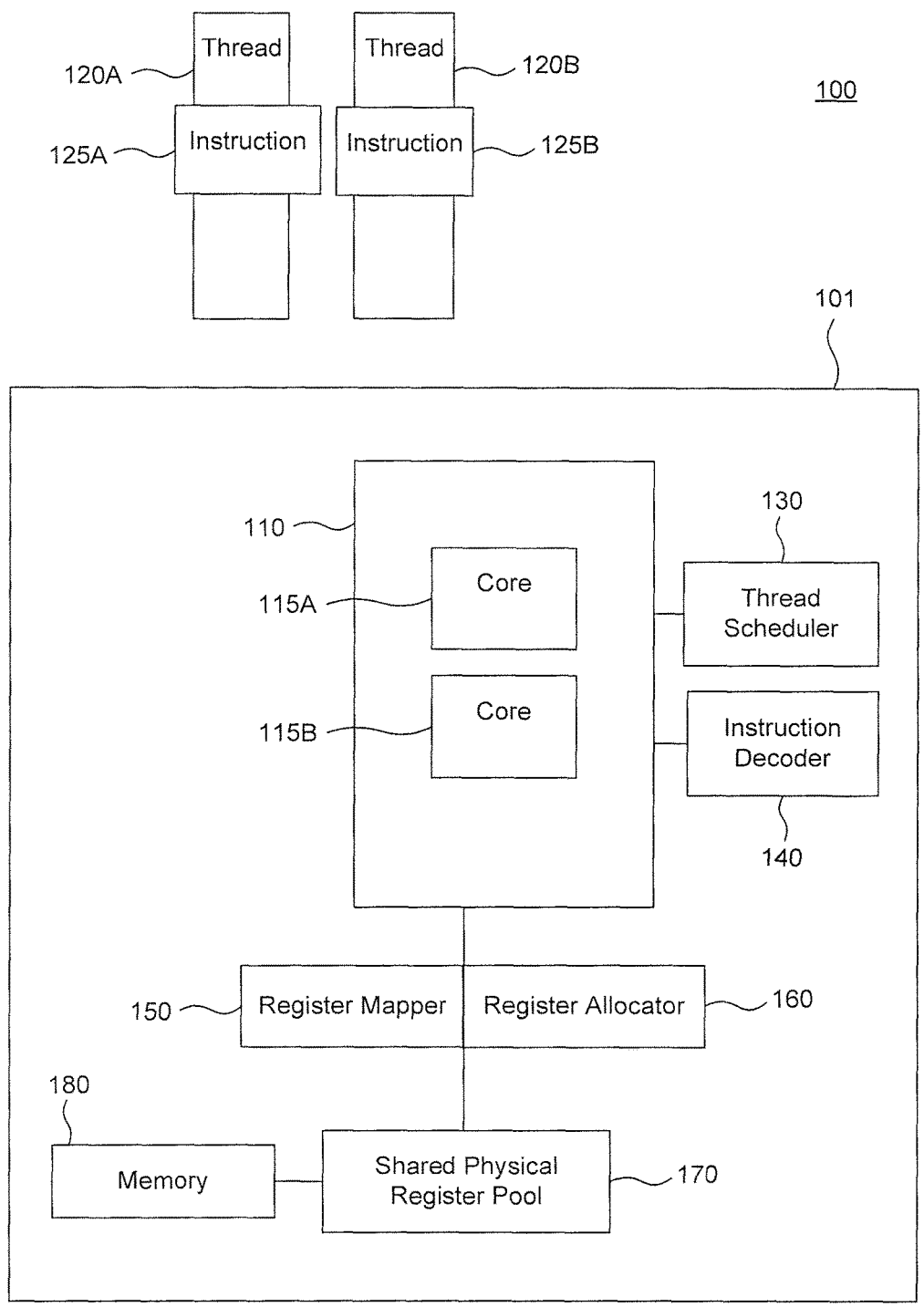
FIG. 1 shows a microprocessor having a system for sharing a shared register pool among a plurality of threads, according to an embodiment.

Features and advantages of the invention will become more apparent from the detailed description of embodiments of the invention set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION

The following detailed description of embodiments of the invention refers to the accompanying drawings that illustrate exemplary embodiments. Embodiments described herein relate to a low power multiprocessor. Other embodiments are possible, and modifications can be made to the embodiments within the spirit and scope of this description. Therefore, the detailed description is not meant to limit the embodiments described below.

It should be apparent to one of skill in the relevant art that the embodiments described below can be implemented in many different embodiments of software, hardware, firmware, and/or the entities illustrated in the figures. Any actual software code with the specialized control of hardware to implement embodiments is not limiting of this description. Thus, the operational behavior of embodiments will be described with the understanding that modifications and variations of the embodiments are possible, given the level of detail presented herein.

It will be appreciated that software embodiments may be implemented or facilitated by or in cooperation with hardware components enabling the functionality of the various software routines, modules, elements, or instructions. Example hardware components are described further with respect to FIG. 7 below, e.g., processor core 700 that includes an execution unit 702, a fetch unit 704, a floating point unit 706, a load/store unit 708, a memory management unit (MMU) 710, an instruction cache 712, a data cache 714, a bus interface unit 716, a multiply/divide unit (MDU) 720, a co-processor 722, general purpose registers 724, a scratch pad 730, and a core extend unit 734.

FIG. 1 shows a system 100 with a microprocessor for sharing a shared physical register pool 170 among a plurality of microprocessor threads 120A-B, according to an embodiment. Microprocessor 101 has processor cores 110, thread scheduler 130, instruction decoder 140, register mapper 150, register allocator 160, and shared physical register pool 170. Processor cores 115A-B respectively execute instructions 125A-B in respective threads 120A-B. An example of the operation of an embodiment is described below.

In an embodiment, during a preliminary stage of the execution of instructions 125A-B in threads 120A-B, the number and type of registers that are required by the instructions is determined. Embodiments can determine information about required registers in a variety of ways. One way is to use information determined during an instruction decode stage of pipelined instruction execution. For example, after instruction 125A is fetched, instruction decoder 140 determines that instruction 125A requires a single 256-bit vector register. It is also possible the instruction decoder 140 could determine that instruction 125A requires a vector register with a bit-width greater than 256 bits.

This requirement for a 256-bit or greater vector register is presented to register allocator 160. Register allocator 160 has resources that track the availability of registers in shared physical register pool 170. In this example, a register of the required type is available in shared physical register pool 170. Example resources used by register allocator 160 are discussed further with reference to FIG. 3 below.

Instruction decoder 140 also determines the logical address referenced by required registers in decoded instructions. Continuing the example above, instruction 125A requires a register having a logical address of three (3). Register allocator 160 determines that a required register is available in shared physical register pool 170 at physical address seven (7). Register mapper 150 establishes and maintains the mapping between logical address (3) referenced by instruction 125A and physical address (7) used in shared physical register pool 170. Using this mapping, instruction 125A is executed by processor core 115A. Example resources used to maintain the mapping by register mapper 150 are discussed further with reference to FIG. 3 below.

Continuing this example, during the execution of instruction 125A by processor core 115A in thread 120A, instruction 125B is decoded by instruction decoder 140. Instruction decoder 140 determines that instruction 125B requires two (2) 256-bit vector registers. Using a process similar to the process described above with reference to instruction 125A, register allocator determines that two registers are available for the execution of instruction 125B. Using thread scheduling rules, thread scheduler 130 schedules the execution of instruction 125B in thread 120B.

In one example, threads 120A and 120B are executed respectively by cores 115A-B and operate simultaneously. With different registers in shared physical register pool 170 allocated to each thread 120A-B, register allocator 160 prevents conflicts in shared physical register pool 170. For example, with instructions 125A and 125B requiring one (1) and two (2) registers respectively, register allocator 160 allocates required registers in shared physical register pool 170.

In another example, threads 120A-B are serially executed by core 115A. By multithreading principles, when thread 120A is descheduled in core 115A, the values stored in referenced registers are temporarily stored in memory 180. When thread 120B is scheduled in core 115A, its register values are stored in registers allocated by register allocator 160. Upon rescheduling of thread 120A, the stored register values are reloaded into shared physical register pool 170.

When the register values of thread 120A are reloaded from memory 180 into shared physical register pool 170, if another thread (not shown) is using shared physical register pool 170 registers while being executed by core 115B, register allocator 160 can direct the reloading of stored register values into different physical registers in shared physical register pool 170. Register mapper 150 maintains the mapping between the logical registers referenced by the reloaded thread 120A and the new physical registers provided by register allocator 160. These two examples are described farther with reference to FIG. 3 below.

Figure 2:
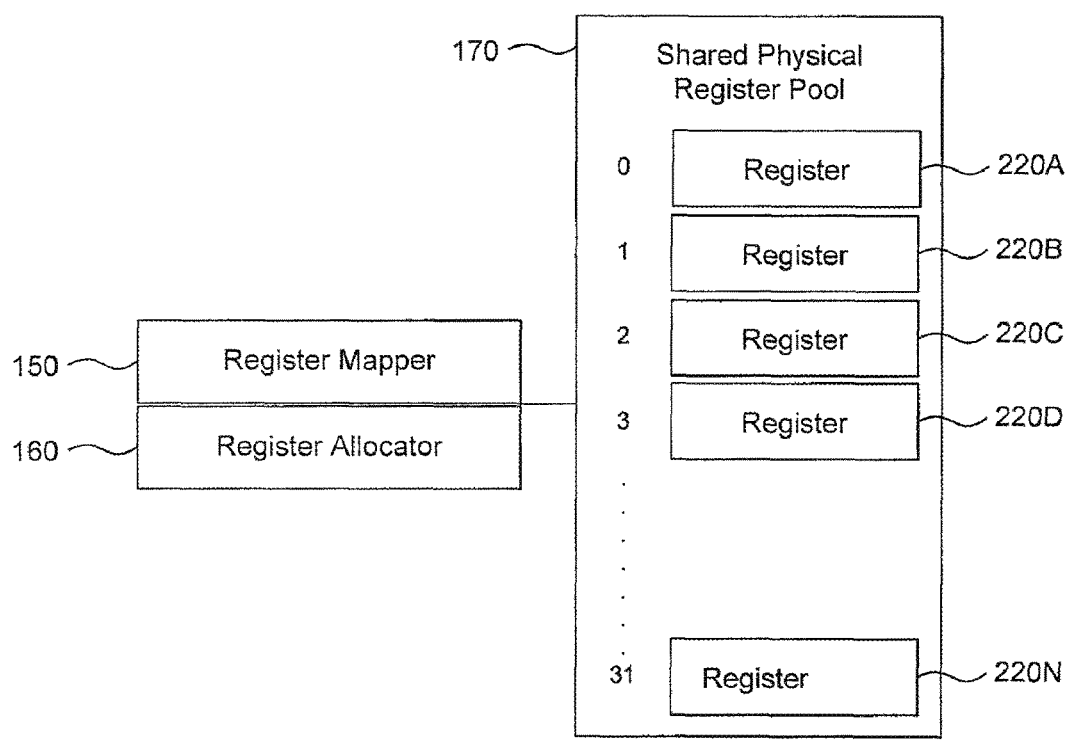
FIG. 2 shows a shared physical register pool, a register mapper and a register allocator, according to an embodiment.

FIG. 2 shows a system 200 for allocating and mapping registers 220A-N in shared physical register pool 170, according to an embodiment. System 200 uses a register mapper 150 and a register allocator 160. In an example not intended to be limiting, shared physical register pool 170 has thirty-two (32) registers 220A-N numbered 0-31. In a variation of this example, registers 220A-N are 256-bit, SIMD vector registers. In other embodiments, registers 220A-N can have different bit widths, e.g., greater than 256 bits, and different types of registers, e.g., floating point registers.

Figure 3:
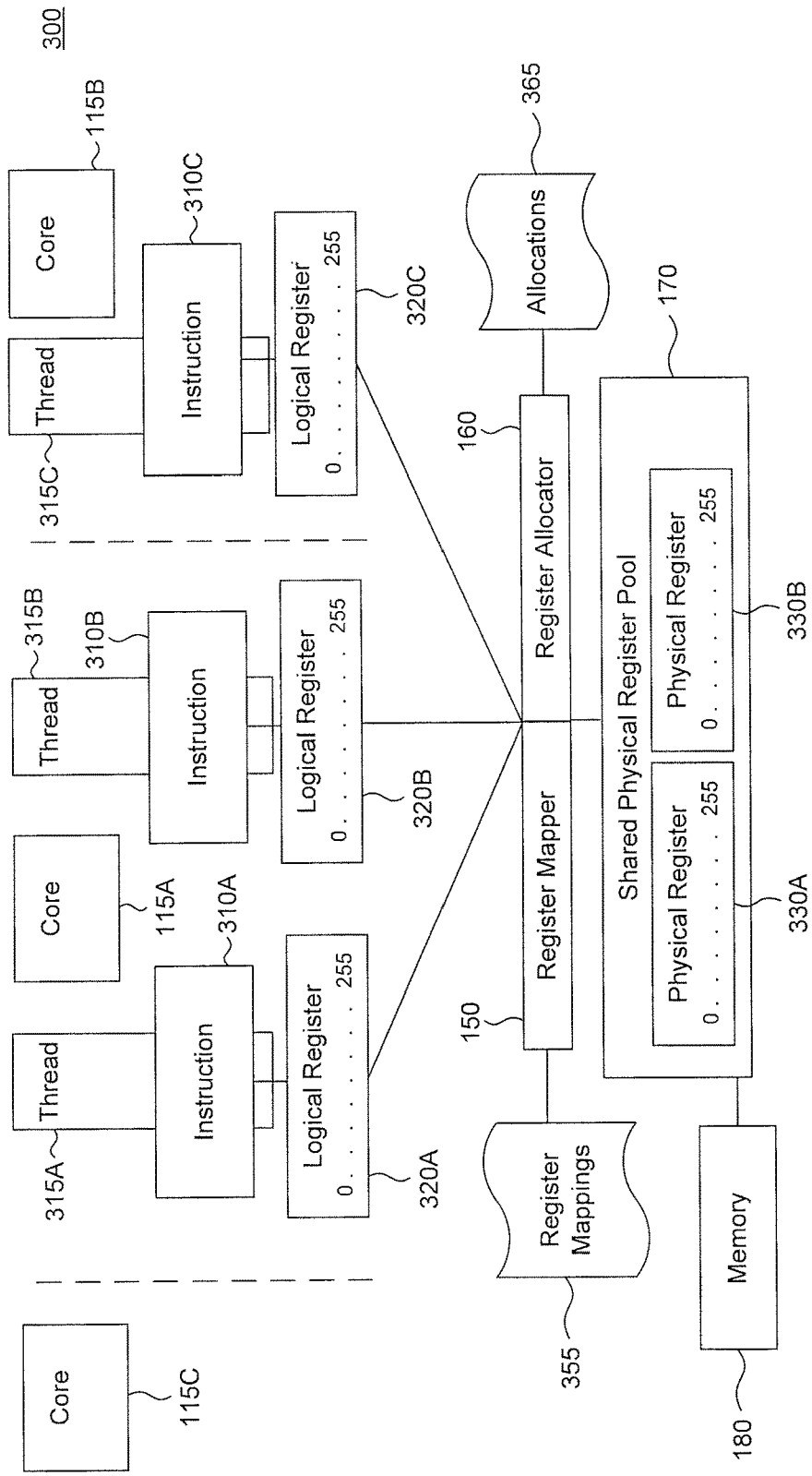
FIG. 3 shows a system for allocating and mapping logical registers to physical registers in a shared physical register pool, according to an embodiment.

FIG. 3 shows a system 300 for allocating and mapping logical registers 320A-C to physical registers 330A-B in shared physical register pool 170, according to an embodiment. Instructions 310A-C are executed respectively by threads 315A-C and respectively reference logical registers 320A-C. It should be noted that different embodiments can work within types of multithreading systems. Embodiments can be implemented with microprocessors having single cores and multiple threads as well as microprocessors with multiple cores and multiple threads per core.

Core 115A is shown executing threads 315A-B and core 115B is shown executing thread 315C. System 300 includes register mapper 150 and register allocator 160. Register mapper 150 uses register mappings 355 and register allocator 160 uses allocations 365.

In another example, core 115A alternatively executes instructions 310A-B using respective threads 315A-B. Upon respective decoding, instruction 310A is determined to require logical register 320A, instruction 310B is determined to require logical register 320B, and instruction 310C is determined to require logical register 320C. It is important to note that, in the examples described herein, threads of the type discussed herein typically have register requirements beyond the one or two registers shown. The small amount of registers discussed herein is for convenience and is not intended to be limiting of different embodiments. In this example, each thread 315A-C only requires a single register for the execution of instructions.

In this example, shared physical register pool 170 has two (2) physical registers 330A-B available, and threads 315A-C that share shared physical register pool 170 require, at maximum three registers. As noted above, these numbers are a simplification for the convenience of discussion. In an example implementation, each thread 315A-C requires thirty-two (32) dedicated registers for the execution of instructions and shared physical register pool has sixty-four (64) registers. Thus, in this more typical example, the three threads 315A-C together require ninety-six (96) registers, and use a shared physical register pool 170 having thirty-two fewer registers than this requirement. Embodiments beneficially fulfill the requirement of example threads 315A-C using the fewer registers available in shared physical register pool 170.

An example sequence of actions performed by embodiments are now discussed. After instructions 310A and 310C are decoded, the register 320A and 320C requirements are submitted to register allocator 160. Register allocator checks allocations 365 and determines that no physical register in shared physical register pool 170 has been assigned to instructions 310A and 310C, and that two physical registers 330A-B are available. Physical registers 330A-B are respectively allocated to instructions 310A and 310C. This allocation is stored in allocations 365 for future use.

Upon allocation of physical registers 330A-B, register mapper accesses the decoded logical register requirements 320A and 320C of respective instructions 310A and 310C. These logical registers 320A and 320C are respectively mapped to physical registers 330A-B. These mappings by register mapper 150 are stored in register mappings 335 for future use. Instructions 310A and 310C in respective threads 315A and 315C are executed respectively by cores 115A and 115B, using respective mapped physical registers 330A-B.

Upon descheduling of thread 315A, the contents of physical registers used by thread 315A in shared physical register pool 170 are stored in storage 180. To determine the registers used by thread 315A and the mapping to logical register 320A, register storage functions are guided by register mapper 150 and register allocator 160. Using allocations 365, register allocator 160 identifies physical register 330A and using register mappings 355, register mapper 150 identifies logical register 320A. Register storage functions store thread 315A register values in memory 180 and register allocator 160 deallocates physical register 330A. Allocations 365 are updated to incorporate this deallocation.

In a process similar to thread 315A described above, the requirement by thread 315B for logical register 320B is provided to register allocator 160. Register allocator identifies that physical register 330A is available, and allocates this physical register to thread 315b. Register mapper 150 maps logical register 320B to physical register 330A. Instruction 310B of thread 315B is executed using core 115A with physical register 330A mapped to logical register 320B.

In a variation of the example above, when thread 315A is to be rescheduled, it is executed by core 115C instead of core 115A. In this example, execution by an additional core 115C allows threads 315B-C to continue executing using physical registers 330A-B in shared physical register pool 170. In an embodiment, thread scheduler 130, in addition to following traditional thread scheduling algorithms, inquires with register allocator 160 to determine whether sufficient physical registers are available in shared physical register pool 170 to support scheduling and execution of thread 315A. If no registers are available, then thread 315A is not scheduled to be executed by core 115C.

Continuing this example, upon descheduling of thread 315C, allocated physical register 330B is available, and thread scheduler 130 schedules the execution of thread 315A. In different embodiments, by incorporating both the control of register allocator 160 and/or thread scheduler 130, the characteristic that shared physical register pool 170 has fewer total registers available than the maximum requirements of threads 315A-C can be beneficially managed.

Figure 4:
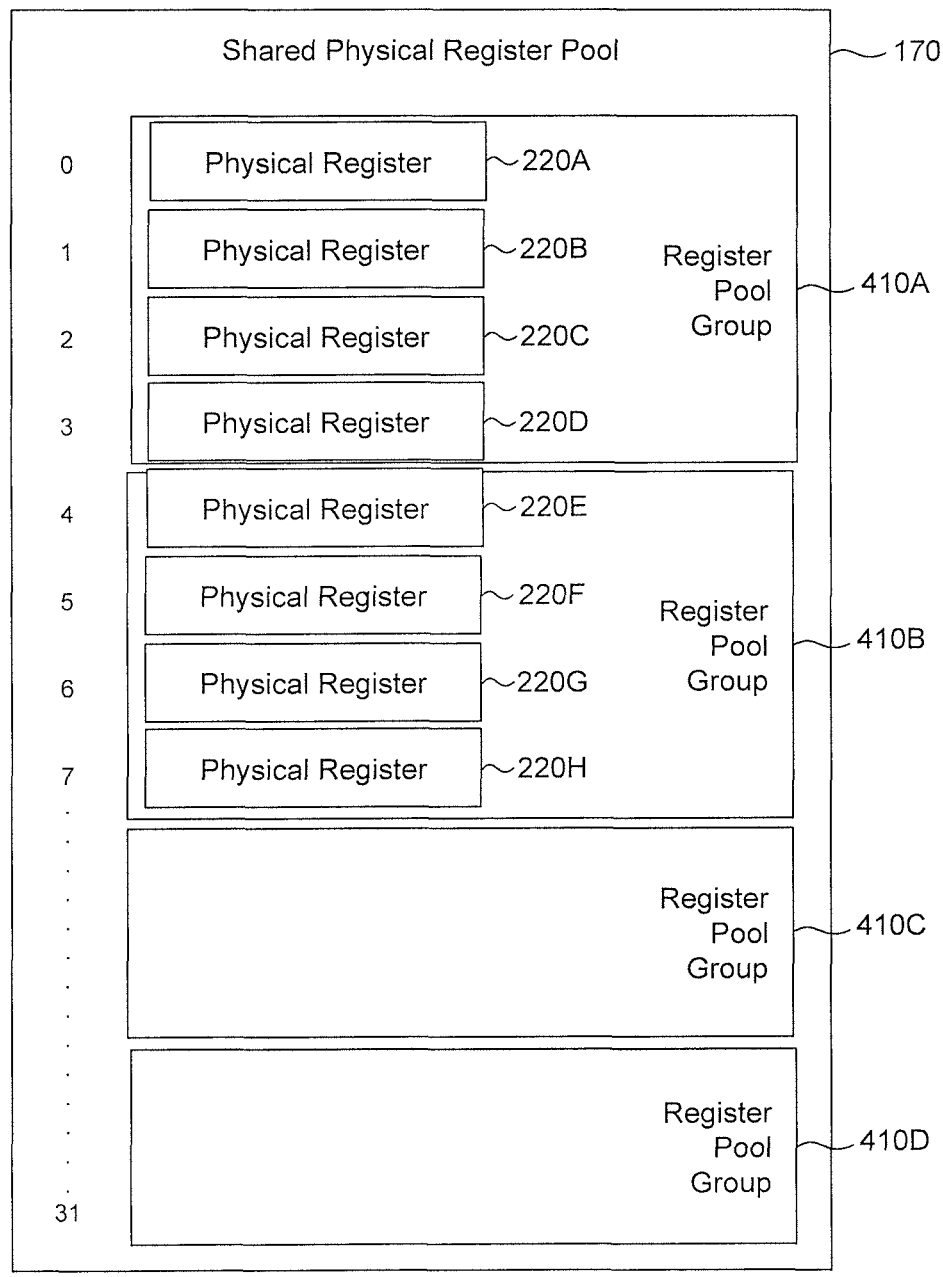
FIG. 4 shows a shared physical register pool having grouped registers, according to an embodiment.

FIG. 4 shows shared physical register pool 170 having register pool groups 410A-D, according to an embodiment. Register pool group 410A has registers 220A-D and register pool group 410B has registers 220E-H. In examples described above, register allocator 160 allocates registers one at a time to threads 315A-C, e.g., when one (1) or two (2) registers are required, one or two registers are allocated.

In the example of shared physical register pool 170 shown on FIG. 4, registers are allocated by register allocator in register pool groups. For example, when up to four registers are requested by a thread, register allocator allocates a register pool group to the thread, e.g., register pool group 410A having registers 220A-D. In an embodiment using register pool groups 410A-D, information stored by allocations 365 is simplified because fewer individual registers must be tracked.

Figure 5:
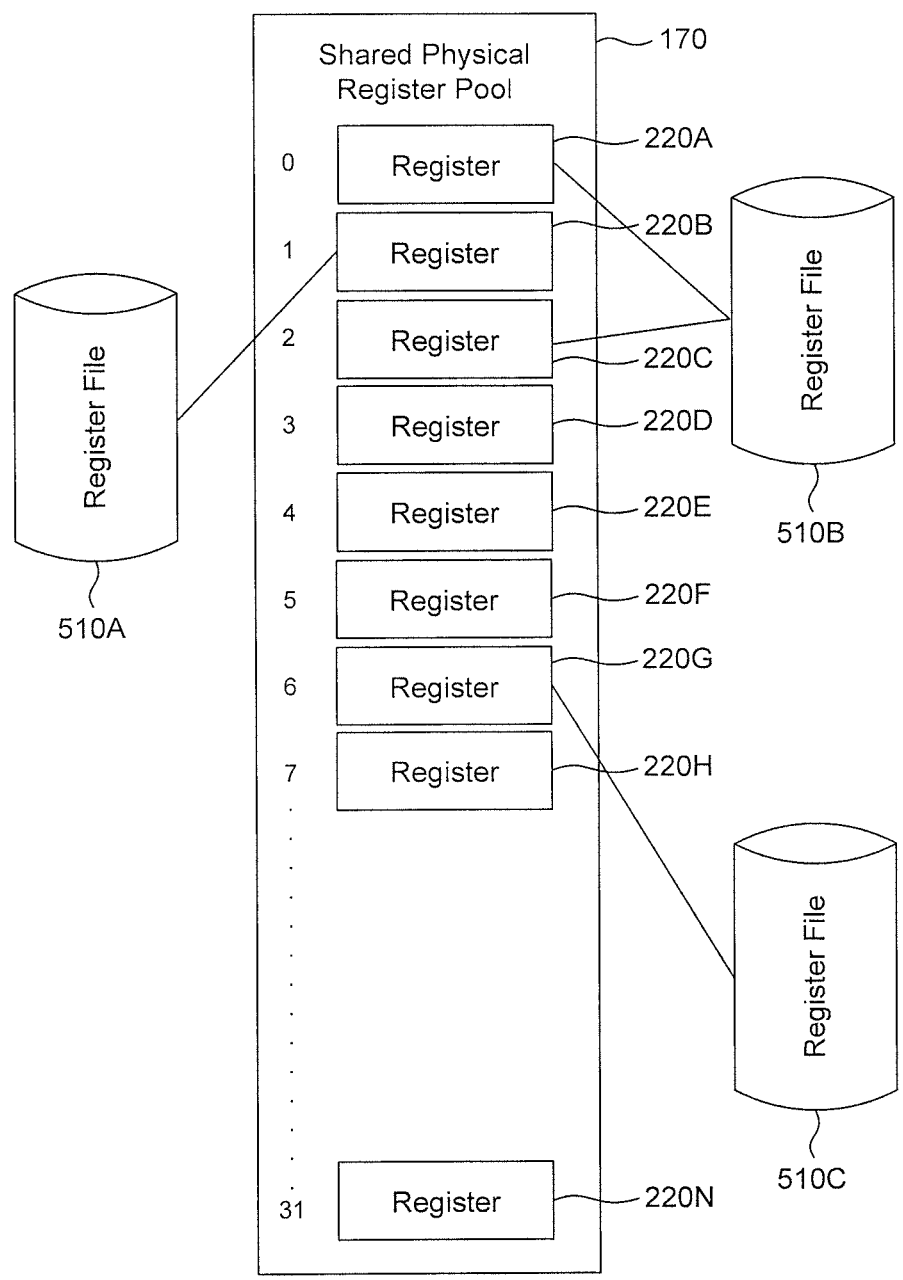
FIG. 5 shows a shared physical register pool having registers stored in different register files, according to an embodiment.

FIG. 5 shows shared physical register pool 170 having register data stored in register files 510A-C. Register data associated with registers 220B is stored in register file 510A. Register data associated with registers 220A and 220C are stored in register file 510B. Register data associated with register 220G is stored in register file 510B. Each of the other example registers 220D-F and 220H-N are also stored in a register file (additional files not shown).

It is important to note that, shared physical register pool 170 can be comprised of multiple register files. In some implementations, a single register file is allocated to a single thread. In embodiments, shared physical register pool 170 provides shared access to multiple register files 510A-C to multiple executing threads.

Method

Figure 6:
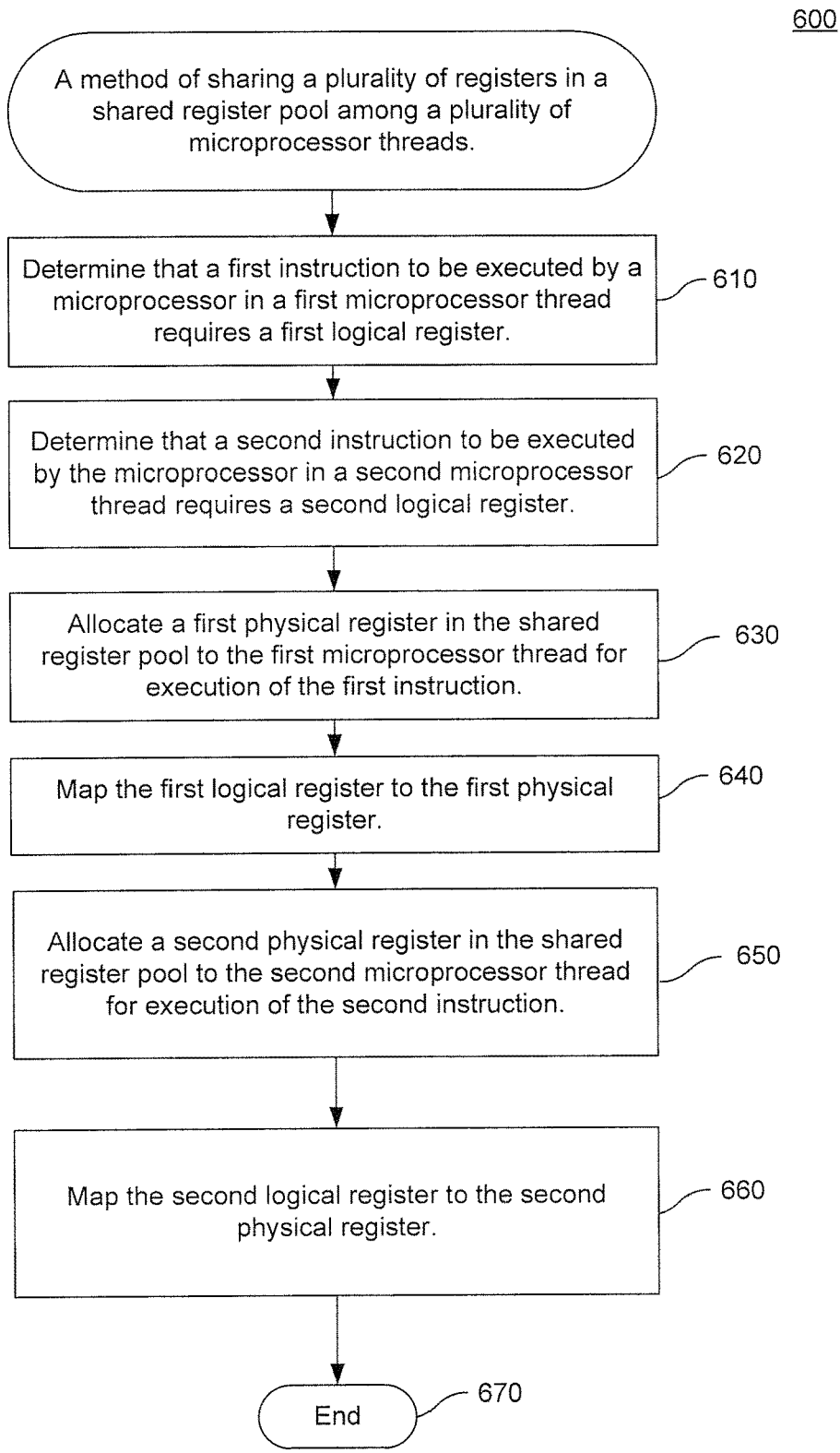
FIG. 6 shows a flowchart illustrating the stages of a method of performing an embodiment.

FIG. 6 is a flowchart illustrating a method 600 of sharing a plurality of registers in a shared physical register pool among a plurality of microprocessor threads, according to an embodiment. The method begins at stage 610 with a determination that a first instruction to be executed by a microprocessor in a first microprocessor thread requires a first logical register. For example, as shown on FIG. 3, instruction 310A is determined to require logical register 320A. Once stage 610 is completed, the method moves to stage 620.

At stage 620, a determination is made that a second instruction to be executed by the microprocessor in a second microprocessor thread requires a second logical register. For example, instruction 310B is determined to require logical register 320B. Logical register 320B could have a bit-width of 256 bits, or a bit-width of greater than 256 bits. Once stage 620 is completed, the method moves to stage 630.

At stage 630, a first physical register in the shared physical register pool is allocated to the microprocessor for execution of the first instruction that is within the first thread. For example, physical register 330A in shared physical register pool 170 is allocated to thread 315A by register allocator 160. Once stage 630 is completed, the method moves to stage 640.

At stage 640, the first logical register is mapped to the first physical register. For example, logical register 320A is mapped to physical register 330A in shared physical register pool 170 by register mapper 150. Once stage 640 is completed, the method moves to stage 650.

At stage 650, a second physical register in the shared physical register pool is allocated to the microprocessor for execution of the second instruction that is within the second thread. For example, For example, physical register 330B in shared physical register pool 170 is allocated to thread 315B by register allocators 160. Once stage 650 is completed, the method moves to stage 660.

At stage 660, the second logical register is mapped to the second physical register. For example, logical register 320B is mapped to physical register 330B in shared physical register pool 170 by register mapper 150. Once stage 660 is completed, the method ends at stage 670.

Example Microprocessor Embodiment

While various embodiments of the present invention have been described above, it should be understood that they have been presented by way of example, and not limitation. It will be apparent to persons skilled in the relevant computer arts that various changes in form and detail can be made therein without departing from the spirit and scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in any known non-transitory computer usable medium including semiconductor, magnetic disk, optical disk (e.g., CD-ROM, DVD-ROM, etc.).

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence. It will be appreciated that embodiments using a combination of hardware and software may be implemented or facilitated by or in cooperation with hardware components enabling the functionality of the various software routines, modules, elements, or instructions, e.g., the components noted above with respect to FIG. 7.

Example Microprocessor Core

Figure 7:
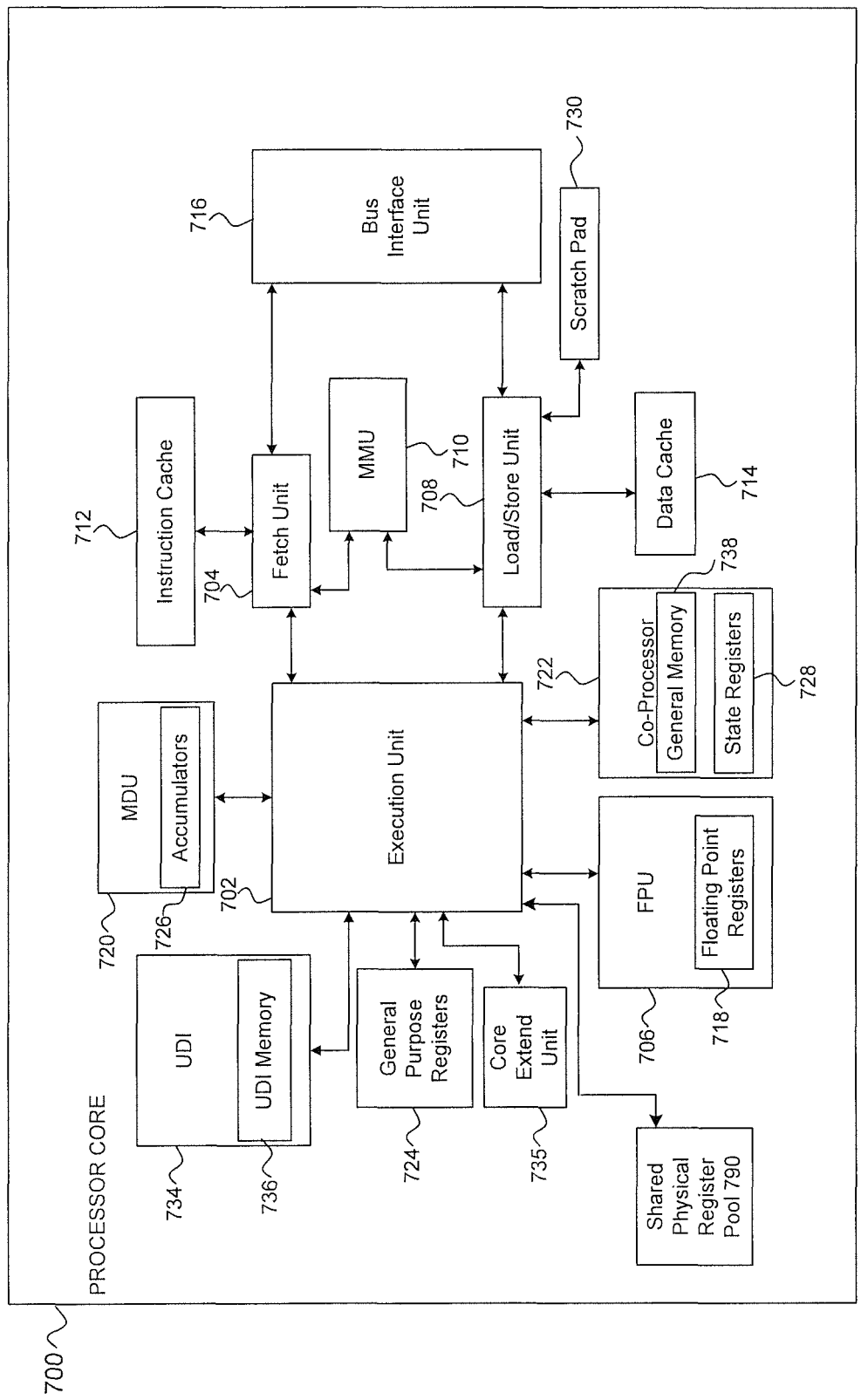
FIG. 7 shows a diagram of an example microprocessor core for implementing a shared physical register pool, according to an embodiment.

FIG. 7 is a schematic diagram of an exemplary processor core 700 according to an embodiment of the present invention for implementing a shared register pool. Processor core 700 is an exemplary processor intended to be illustrative, and not intended to be limiting. Those skilled in the art would recognize numerous processor implementations for use with an ISA according to embodiments of the present invention.

As shown in FIG. 7, processor core 700 includes an execution unit 702, a fetch unit 704, a floating point unit 706, a load/store unit 708, a memory management unit (MMU) 710, an instruction cache 712, a data cache 714, a bus interface unit 716, a multiply/divide unit (MDU) 720, a co-processor 722, general purpose registers 724, a scratch pad 730, and a core extend unit 734. While processor core 700 is described herein as including several separate components, many of these components are optional components and will not be present in each embodiment of the present invention, or components that may be combined, for example, so that the functionality of two components reside within a single component. Additional components may also be added. Thus, the individual components shown in FIG. 7 are illustrative and not intended to limit the present invention.

Execution unit 702 preferably implements a load-store (RISC) architecture with single-cycle arithmetic logic unit operations (e.g., logical, shift, add, subtract, etc.). Execution unit 702 interfaces with fetch unit 704, floating point unit 706, load/store unit 708, multiple-divide unit 720, co-processor 722, general purpose registers 724, and core extend unit 734.

Fetch unit 704 is responsible for providing instructions to execution unit 702. In one embodiment, fetch unit 704 includes control logic for instruction cache 712, a recoder for recoding compressed format instructions, dynamic branch prediction and an instruction buffer to decouple operation of fetch unit 704 from execution unit 702. Fetch unit 704 interfaces with execution unit 702, memory management unit 710, instruction cache 712, and bus interface unit 716.

Floating point unit 706 interfaces with execution unit 702 and operates on non-integer data. Floating point unit 706 includes floating point registers 718. In one embodiment, floating point registers 718 may be external to floating point unit 706. Floating point registers 718 may be 32-bit or 64-bit registers used for floating point operations performed by floating point unit 706. Typical floating point operations are arithmetic, such as addition and multiplication, and may also include exponential or trigonometric calculations.

Load/store unit 708 is responsible for data loads and stores, and includes data cache control logic. Load/store unit 708 interfaces with data cache 714 and scratch pad 730 and/or a fill buffer (not shown). Load/store unit 708 also interfaces with memory management unit 710 and bus interface unit 716.

Memory management unit 710 translates virtual addresses to physical addresses for memory access. In one embodiment, memory management unit 710 includes a translation lookaside buffer (TLB) and may include a separate instruction TLB and a separate data TLB. Memory management unit 710 interfaces with fetch unit 704 and load/store unit 708.

Instruction cache 712 is an on-chip memory array organized as a multi-way set associative or direct associative cache such as, for example, a 2-way set associative cache, a 4-way set associative cache, an 8-way set associative cache, et cetera. Instruction cache 712 is preferably virtually indexed and physically tagged, thereby allowing virtual-to-physical address translations to occur in parallel with cache accesses. In one embodiment, the tags include a valid bit and optional parity bits in addition to physical address bits. Instruction cache 712 interfaces with fetch unit 704.

Data cache 714 is also an on-chip memory array. Data cache 714 is preferably virtually indexed and physically tagged. In one embodiment, the tags include a valid bit and optional parity bits in addition to physical address bits. Data cache 714 interfaces with load/store unit 708.

Bus interface unit 716 controls external interface signals for processor core 700. In an embodiment, bus interface unit 716 includes a collapsing write buffer used to merge write-through transactions and gather writes from uncached stores.

Multiply/divide unit 720 performs multiply and divide operations for processor core 700. In one embodiment, multiply/divide unit 720 preferably includes a pipelined multiplier, accumulation registers (accumulators) 726, and multiply and divide state machines, as well as all the control logic required to perform, for example, multiply, multiply-add, and divide functions. As shown in FIG. 7, multiply/divide unit 720 interfaces with execution unit 702. Accumulators 726 are used to store results of arithmetic performed by multiply/divide unit 720.

Co-processor 722 performs various overhead functions for processor core 700. In one embodiment, co-processor 722 is responsible for virtual-to-physical address translations, implementing cache protocols, exception handling, operating mode selection, and enabling/disabling interrupt functions. Co-processor 722 interfaces with execution unit 702. Co-processor 722 includes state registers 728 and general memory 738. State registers 728 are generally used to hold variables used by co-processor 722. State registers 728 may also include registers for holding state information generally for processor core 700. For example, state registers 728 may include a status register. General memory 738 may be used to hold temporary values such as coefficients generated during computations. In one embodiment, general memory 738 is in the form of a register file.

General purpose registers 724 are typically 32-bit or 64-bit registers used for scalar integer operations and address calculations. In one embodiment, general purpose registers 724 are a part of execution unit 702. Optionally, one or more additional register file sets, such as shadow register file sets, can be included to minimize content switching overhead, for example, during interrupt and/or exception processing. As described with the descriptions of FIGS. 1-6 above, shared register pool can supplement or replace portions of general purpose registers 424 and floating point registers 418. As also noted above, in an embodiment, shared physical register pool 790 can be composed of SIMD registers.

Scratch pad 730 is a memory that stores or supplies data to load/store unit 708. The one or more specific address regions of a scratch pad may be pre-configured or configured programmatically while processor core 700 is running. An address region is a continuous range of addresses that may be specified, for example, by a base address and a region size. When base address and region size are used, the base address specifies the start of the address region and the region size, for example, is added to the base address to specify the end of the address region. Typically, once an address region is specified for a scratch pad, all data corresponding to the specified address region are retrieved from the scratch pad.

User Defined Instruction (UDI) unit 734 allows processor core 700 to be tailored for specific applications. UDI 734 allows a user to define and add their own instructions that may operate on data stored, for example, in general purpose registers 724. UDI 734 allows users to add new capabilities while maintaining compatibility with industry standard architectures. UDI 734 includes UDI memory 736 that may be used to store user added instructions and variables generated during computation. In one embodiment, UDI memory 736 is in the form of a register file.

CONCLUSION

Embodiments described herein relate to a shared register pool. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method of rescheduling threads among a plurality of microprocessor cores of a multithreaded microprocessor including a shared pool of physical registers, the method comprising:

determining that a first instruction in a first thread to be executed by a first microprocessor core of said multithreaded microprocessor requires a first logical register;

determining that a second instruction in a second thread to be executed by a second microprocessor core of said multithreaded microprocessor requires a second logical register;

allocating a first physical register in the shared pool to the first thread for execution of the first instruction;

mapping the first logical register to the first physical register;

allocating a second physical register in the shared pool to the second thread for execution of the second instruction;

mapping the second logical register to the second physical register;

upon determining that the first thread should be descheduled, storing contents of said first physical register to a memory, and deallocating said first physical register from the first thread;

upon determining that the first thread should be rescheduled, determining whether sufficient physical registers are available in the shared pool to support execution of the first thread;

if sufficient physical registers in the shared pool are available, mapping said first logical register to an available physical register in the shared pool and loading said stored contents of the first thread from said memory to said mapped available physical register; and rescheduling the first thread for execution by a third microprocessor core of said multithreaded microprocessor.

2. The method of claim 1, wherein:

determining that the first instruction requires a first logical register comprises determining that a first single instruction multiple data (SIMD) instruction requires a first logical SIMD register, and
determining that the second instruction requires a second logical register comprises determining that a second SIMD instruction requires a second logical SIMD register.

3. The method of claim 1, wherein determining that the first thread should be descheduled comprises determining that an instruction in a third thread needs to be executed by the first microprocessor core and requires a third logical register; and the method further comprises:
allocating the first physical register in the shared pool to the third thread and mapping the third logical register to the first physical register after said contents of the first physical register have been stored to said memory and the first physical register has been deallocated from the first thread.

4. The method of claim 3, wherein the first thread is not rescheduled for execution when sufficient physical registers are unavailable for allocation from the shared pool.

5. The method of claim 1, further comprising before the second physical register is allocated for execution of the second instruction by the second microprocessor core:
determining whether the second physical register is available for allocation in the shared pool, wherein the second physical register is only allocated when it is available and the second instruction is only executed by the second microprocessor core when the first or second physical register is allocated to the second instruction.

6. The method of claim 1, wherein:
the first thread associated with the first microprocessor core requires a maximum first number of logical registers, the second thread associated with the second microprocessor core requires a maximum second number of logical registers, and said shared pool has a number of registers fewer than the total of the first number and the second number.

7. The method of claim 1, wherein said shared pool comprises a plurality of register files.

8. The method of claim 1 wherein determining that the first instruction requires a first logical register comprises determining that the first instruction requires a first logical register having a bit-width greater than 256 bits, and determining that the second instruction requires a second logical register comprises determining that the second instruction requires a second logical register having a bit-width greater than 256 bits.

9. The method of claim 1, wherein:
determining that the first instruction requires the first logical register comprises determining that the first instruction requires a first logical vector register, and
determining that the second instruction requires the second logical register comprises determining that the second instruction requires a second logical vector register.

10. The method of claim 1, wherein physical registers are allocated in the shared pool in groups of two or more physical registers.

11. The method of claim 1, wherein the first instruction in the first thread is executed by the first microprocessor core simultaneously with the execution of the second instruction in the second thread by the second microprocessor core.

12. The method of claim 1, wherein allocating the first physical register comprises allocating a group of physical registers that includes the first physical register.

13. The method of claim 12, further comprising:
tracking the registers in the group of physical registers as a group.

14. A system of rescheduling threads among a plurality of microprocessor cores of a multithreaded microprocessor including a shared pool of physical registers, the system comprising:
a register determiner circuit configured to determine that a first instruction in a first thread to be executed by a first microprocessor core of said multithreaded microprocessor requires a first logical register, and determine that a second instruction in a second thread to be executed by a second microprocessor core of said multithreaded microprocessor requires a second logical register;
a register allocator circuit configured to:
allocate a first physical register in the shared pool to the first thread for execution of the first instruction by the first microprocessor core,
allocate a second physical register in the shared pool to the second thread for execution of the second instruction by the second microprocessor core,
upon determining that the first thread should be descheduled, store contents of said first physical register to a memory, and deallocate said first physical register from the first thread, and
upon determining that the first thread should be rescheduled, determine whether sufficient physical registers are available in the shared pool to support execution of the first thread; and
a register mapper circuit configured to, if sufficient physical registers in the shared pool are available, map said first logical register to an available physical register in said shared pool, and load said stored contents of the first thread from said memory to said mapped available physical register;
wherein the first thread is rescheduled for execution by a third microprocessor core of said multithreaded microprocessor.

15. The system of claim 14, wherein the first and second instructions are single instruction multiple data (SIMD) instructions and the first and second logical registers are logical SIMD registers.

16. The system of claim 14, wherein:
the register determiner circuit is further configured to determine that the first thread should be descheduled by determining that a third instruction is to be executed by the first microprocessor core in a third thread; and
the register allocator circuit is further configured to:
allocate the first physical register in the shared pool to the third thread for execution of the third instruction by the first microprocessor core; and
map the third logical register to the first physical register.

17. The system of claim 16, further comprising:
a thread scheduler circuit configured to determine whether to reschedule the first thread for execution based on a signal from the register allocator circuit that a physical register is available in the shared pool, wherein the thread scheduler circuit is configured to reschedule the first thread for execution by the first microprocessor core only when a physical register is available for allocation to the first thread from the shared pool.

18. The system of claim 14, further comprising:
a thread scheduler circuit configured to determine whether to schedule the second thread for execution by the second microprocessor core based on a signal from the register allocator circuit that the second physical register is available for allocation in the shared pool, wherein the thread scheduler circuit is configured to schedule the second thread for execution by the second microprocessor core only when the first or second physical register is available for allocation to the second thread from the shared pool.

19. The system of claim 14, wherein:
the first thread requires a maximum first number of logical registers, the second thread requires a maximum second number of logical registers, and the shared pool has a number of registers fewer than the total of the first number and the second number.

20. The system of claim 14, wherein the shared pool comprises a plurality of register files.

21. The system of claim 14, wherein the first instruction requires a first logical register having a bit-width greater than 256 bits, and the second instruction requires a second logical register having a bit-width greater than 256 bits.

22. The system of claim 14, wherein the logical registers are logical vector registers and the physical registers are physical vector registers.

23. The system of claim 14, wherein the register allocator circuit is configured to allocate physical registers in the shared pool in groups of two or more physical registers.

24. The system of claim 14, wherein the first instruction in the first thread is executed by the first microprocessor core simultaneously with the execution of the second instruction in the second thread by the second microprocessor core.

25. A non-transitory computer readable storage medium having encoded thereon computer readable program code for generating a multithreaded microprocessor including a shared pool of physical registers comprising:
a register determiner circuit configured to determine that a first instruction in a first thread to be executed by a first microprocessor core of said multithreaded microprocessor requires a first logical register, and determine that a second instruction in a second thread to be executed by a second microprocessor core of said multithreaded microprocessor requires a second logical register;
a register allocator circuit configured to:
allocate a first physical register in the shared pool to the first thread for execution of the first instruction by the first microprocessor core,
allocate a second physical register in the shared pool to the second thread for execution of the second instruction by the second microprocessor core,
upon determining that the first thread should be descheduled, store contents of said first physical register to a memory, and deallocate said first physical register from the first thread, and
upon determining that the first thread should be rescheduled, determine whether sufficient physical registers are available in the shared pool to support execution of the first thread; and
a register mapper circuit configured to, if sufficient physical registers in the shared pool are available, map said first logical register to an available physical register in said shared pool, and load said stored contents of the first thread from said memory to said mapped available physical register;
wherein the first thread is rescheduled for execution by a third microprocessor core of said multithreaded microprocessor.

26. The non-transitory computer readable storage medium of claim 25, wherein the first instruction in the first thread is executed by the first microprocessor core simultaneously with the execution of the second instruction in the second thread by the second microprocessor core.

* * * * *